United States Patent
Kordecki et al.

[11] Patent Number: 5,551,716
[45] Date of Patent: Sep. 3, 1996

[54] PUSHABLE GOLF CART

[75] Inventors: Michael E. Kordecki, 298 E. Saddle Back Rd., Vernon Hills, Ill. 60061; John R. Kordecki, Arlington Heights, Ill.

[73] Assignee: Michael E. Kordecki, Vernon Hills, Ill.

[21] Appl. No.: 175,795

[22] Filed: Dec. 30, 1993

[51] Int. Cl.[6] .................................................. B62B 1/04
[52] U.S. Cl. ........................... 280/47.18; 280/47.23; 280/47.26; 280/645; 280/654; D34/15
[58] Field of Search .................. 224/274; 280/DIG. 6, 280/47.17, 47.18, 47.26, 47.23, 47.24, 641, 654, 645; D34/15

[56] References Cited

U.S. PATENT DOCUMENTS

| | | | |
|---|---|---|---|
| D. 166,464 | 4/1952 | Gunning | 280/DIG. 6 |
| 752,190 | 2/1904 | Tieman | 280/47.23 |
| 993,265 | 5/1911 | McCoy | 280/47.18 |
| 2,425,688 | 8/1947 | Schulte | 280/DIG. 6 |
| 2,449,910 | 9/1948 | Quiring | 280/DIG. 6 |
| 2,658,771 | 11/1953 | Rutledge et al. | 280/DIG. 6 |
| 2,855,210 | 10/1958 | Joyce | 280/47.26 |
| 2,941,814 | 6/1960 | Mihalyi . | |
| 3,265,402 | 8/1966 | Snyder | 280/DIG. 6 |
| 3,479,052 | 11/1969 | Spielman | 280/645 |
| 3,726,537 | 4/1973 | McLoughlin | 280/DIG. 6 |
| 3,820,617 | 6/1974 | Groff . | |
| 4,061,360 | 12/1977 | Evans et al. . | |
| 4,152,003 | 5/1979 | Reineccius et al. | 280/47.18 |
| 4,220,346 | 9/1980 | Geschwenger | 280/47.18 |
| 4,343,487 | 8/1982 | Crothers | 280/47.26 X |
| 4,784,401 | 11/1988 | Raguet | 280/DIG. 6 |
| 5,106,117 | 4/1992 | Wang . | |
| 5,149,116 | 9/1992 | Donze et al. | 280/47.26 |
| 5,294,158 | 3/1994 | Cheng | 280/641 |

FOREIGN PATENT DOCUMENTS

| | | | |
|---|---|---|---|
| 0138870 | 2/1948 | Australia | 280/DIG. 6 |
| 0166118 | 11/1949 | Australia | 280/47.26 |
| 0338357 | 6/1959 | Switzerland | 280/DIG. 6 |
| 0483754 | 4/1938 | United Kingdom | 280/DIG. 6 |
| 0667237 | 2/1952 | United Kingdom | 280/DIG. 6 |
| 0719748 | 12/1954 | United Kingdom | 280/DIG. 6 |

*Primary Examiner*—J. Casimer Jacyna
*Attorney, Agent, or Firm*—Olson & Hierl, Ltd.

[57] ABSTRACT

A pushable cart for transporting a golf bag includes a carriage frame and cradle. The carriage frame is connected to wheels at one end and has a handle at the other end. The cradle is connected to the carriage frame in an angular relation so that the cart is generally X-shaped. The cart can be made foldable or collapsible for transportation and storage. The cart also has structurally rigid design which allows the cart to be made of light weight metal. Moreover, the carts can be made nestable to provide space economy during storage.

19 Claims, 2 Drawing Sheets

PUSHABLE GOLF CART

FIELD OF THE INVENTION

This invention pertains to golf carts. More particularly, the invention pertains to golf carts for transporting golf bags that reduce the physical strain of the user and facilitate movement over various types of terrain.

BACKGROUND OF THE INVENTION

Some golfers prefer to walk while playing golf. These golfers usually use pull carts to carry their golf bags. Such golf carts are disclosed in Evans et al. U.S. Pat. No. 4,061,360 entitled "COLLAPSIBLE GOLF BAG CART," Reineccius et al. U.S. Pat. No. 4,152,003 entitled "GOLF EQUIPMENT," Wang et al. U.S. Pat. No. 5,106,117 entitled "FOLDING GOLF CART," and Groff U.S. Pat. No. 3,820,617 entitled "GOLF CARTS."

All of the above-cited patents disclose a golf cart for a golf bag having two wheels, a golf bag support and a handle. Typically, a lower end of the golf bag support and the two wheels form a tripod to maintain the golf cart substantially upright when not in use. The handle is typically located at an upper end of the golf bag support. When a golf bag is placed on the cart, it lies generally adjacent and parallel to the cart, and distal to the handle.

When the cart is used, the handle is pulled down in such a way to pivot the golf cart and bag over the wheels. In this manner, the cart is pulled with the golfer ahead of the cart.

Although these golf carts are useful in transporting golf bags, several disadvantages exist. The disclosed golf carts are designed to be pulled. The pulling of the cart, exaggerated by the upright position, causes straining of the lower back and shoulder of the user. To avoid this strain, many users will try to push these carts.

However, pushing the above-disclosed carts presents other disadvantages. First, pushing these carts causes the bag carrier to dig into the ground when the user attempts to climb an incline. To overcome this, the user must lower the golf bag closer to the ground by lowering the handle to further pivot the golf cart and bag over the wheels. This, however, causes the user more physical strain by having to bend over, or extend her arm and shoulder unnaturally lower. Second, when pushed on relatively level terrain, the carts have a tendency to pivot forward.

Some of the above-cited patents have a shaft as part of the golf bag support that runs from the wheels to the handle. When a bag is placed onto one of these disclosed carts, the shaft interferes with the bag handle to cause the bag to rotate. This rotation causes the clubs to stack up in the bag, which hinders insertion and withdrawal of the clubs from the bag.

All of the disclosed patented carts, and other non-disclosed carts have the handles typically placed above and generally next to the mouth of the golf bag. This placement impedes club insertion into and withdrawal from the mouth of the bag.

Thus, there continues to be a need to provide a golf cart that lessens the muscular strain of its user and can traverse different types of terrain while being structurally rigid, yet of light weight.

SUMMARY OF THE INVENTION

A pushable golf cart or carriage according to the present invention includes a carriage frame and a golf bag cradle for removably retaining a golf bag. The cradle, which is preferably a U-shaped frame, is transversely connected in an angular relationship to the carriage in an angular relation. Hence, the carriage and support resemble a generally X-shaped configuration from a side view.

The carriage frame is also preferably generally U-shaped. The elongated, upstanding carriage frame terminates at an upper end in a handle. A lower, open end of the carriage frame extends downward to connect to a pair of carriage wheels. Extending between both ends are preferably generally coplanar parallel arms. Each arm preferably has a length in the range of about forty-two inches.

Preferably, each arm terminates at the lower end into respective bent portions or wheel bights. Each wheel bight is angled in the same direction downwardly from the arms and is connected to a respective preferably outwardly oriented stub axle. Separate axles are used so that the wheels can rotate unencumbered. However, one axle can be used, or the axles may be omitted so that the wheels are connected directly to the carriage frame by, for example, bending outwardly a segment of each wheel bight to function as an axle.

The axles are connected to respective wheels. Preferably, the wheels have a small diameter and are spaced substantially apart to provide a stable base for the cart, especially over various types of terrains. The wheel spacing is in the range of about 14 to 20 inches, but preferably is about 14½ inches. The diameter of the wheels is in the range of 8 to 15 inches, but is preferably about 12 inches. The present invention is not limited to a pair of wheels, however, any convenient number may be used. Further, the invention can be used with any device that facilitates movement of the cart, e.g., rollers, casters, and the like, not just wheels.

Each arm terminates at the upper end of the carriage frame preferably in a configuration such as respective handle bights. The bights are bent upwardly from the carriage frame and include a handle bar extending between each terminus of the handle bights.

The U-shaped cradle also has two generally coplanar parallel arms that extend between open upper and closed lower ends. The cradle arms have a length in the range of about twenty-eight inches. When connected to the carriage frame, the open upper end extends upwardly from the carriage. The arms terminate at the closed lower end into base bights that are connected together by an end brace. These cradle bights and end brace form a base. Preferably, a cross brace is generally situated between the respective arms at the base bight junction.

The base preferably has an inside width between the base bights of nine and three-quarters inches to snugly hold a typical golf bag. The base together with the wheels provides a stand for the cart. When standing, the base is located between the wheels and handle, and the handle is at an acute angle relative to the ground.

Generally situated at the open upper end is a guide, preferably U-shaped, connected between both arms of the cradle. The guide longitudinally aligns the bag with the cradle and is connected to both cradle arms to brace the cradle, which translates to an overall more rigid cart. A retaining device, such as a strap, may be connected to either the guide or on the cradle to removably retain and stabilize a golf bag while mounted on the cradle. The U-shape of the cradle does not interfere with a mounted bag so that the bag will not pivot and stack the contained clubs.

The carriage frame and cradle can be connected at a predetermined pivot point to provide a collapsible cart. The cradle can be maintained in an angular relationship to the carriage frame by a lockable hinge located proximal to the pivot point. Or, the cradle can be permanently affixed to the carriage frame in any desired angular relation, preferably generally X-shaped. The cradle, being generally shorter in length than a typical golf bag, will preferably situate the center of gravity of the bag above the carriage frame so that the cart will tilt away from the operator of the cart when the handle is lifted. In effect, this will encourage the cart to move in the pushed or forward direction.

Another embodiment includes a carriage frame having a generally forked or bifurcated shape. The opened lower end of the frame is connected to a pair of carriage wheels in the same manner as the U-shaped carriage frame explained above. However, the arms of the forked frame are preferably shorter than the arms of the U-shaped carriage frame. The arms of the forked frame terminate at a closed upper end or arm junction into an elongated stem that terminates into a handle bight. The handle bight extends from the stem in generally upwardly direction from the cart. A handle is joined to the handle bight and is oriented generally parallel to the stem.

This other embodiment has a golf bag cradle that has a cradle rod instead of the U-shaped frame previously described. The cradle rod is connected to a bag stop or base at its lower end. Guides are also generally situated at the lower and upper ends of the cradle rod.

The cradle of this other embodiment has a cradle axle that generally perpendicularly intersects the cradle rod and is rotatably connected to the carriage frame between the carriage frame arms. The cradle can be locked or fixedly connected apart from the carriage frame.

Both embodiments can be foldable or collapsible. The arms of the carriage frame can telescope or fold. The guides of the cradles can pivot at their connections with the cradle arms so that they can be situated substantially coplanar with the cradle while the cart is not in use. The base or bag stop of the cradle can also fold to be generally adjacent and coplanar with the cradle.

Further, the angular relationship of the cradle and carriage frame prevents the handle from interfering with club insertion into or withdrawal from the golf bag. Additionally, the cradle and carriage frame of one of the above embodiments can be used in conjunction with the carriage frame and cradle of the other embodiment, respectively. Thus, various cart configurations are possible.

A method for manufacturing a golf bag cart according to the present invention may include the steps of: providing a carriage frame that includes a movement facilitating apparatus and a handle, and connecting a cradle to the carriage frame so that when the handle is lifted, the cradle having a bag supported thereon will be elevated and will facilitate the forward movement of the cart.

A method of operation of a golf bag cart according to the present invention may include the steps of: cradling a golf bag on a golf bag cradle where the cradle is mounted to a carriage frame so that the center of gravity of the cart is above the carriage frame, and the cradle and the carriage frame are at an obtuse angle relative to one another.

One of the novel aspects of the present invention is than the cradle and the carriage frame intersect at the predetermined pivot point to preferably form an angular relationship, such as an obtuse angle between the wheels and base. This intersection angle and pivot point combine to transfer more of the weight of the cart and bag towards the wheels when lifted by the handle.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENTS

Figure 1:
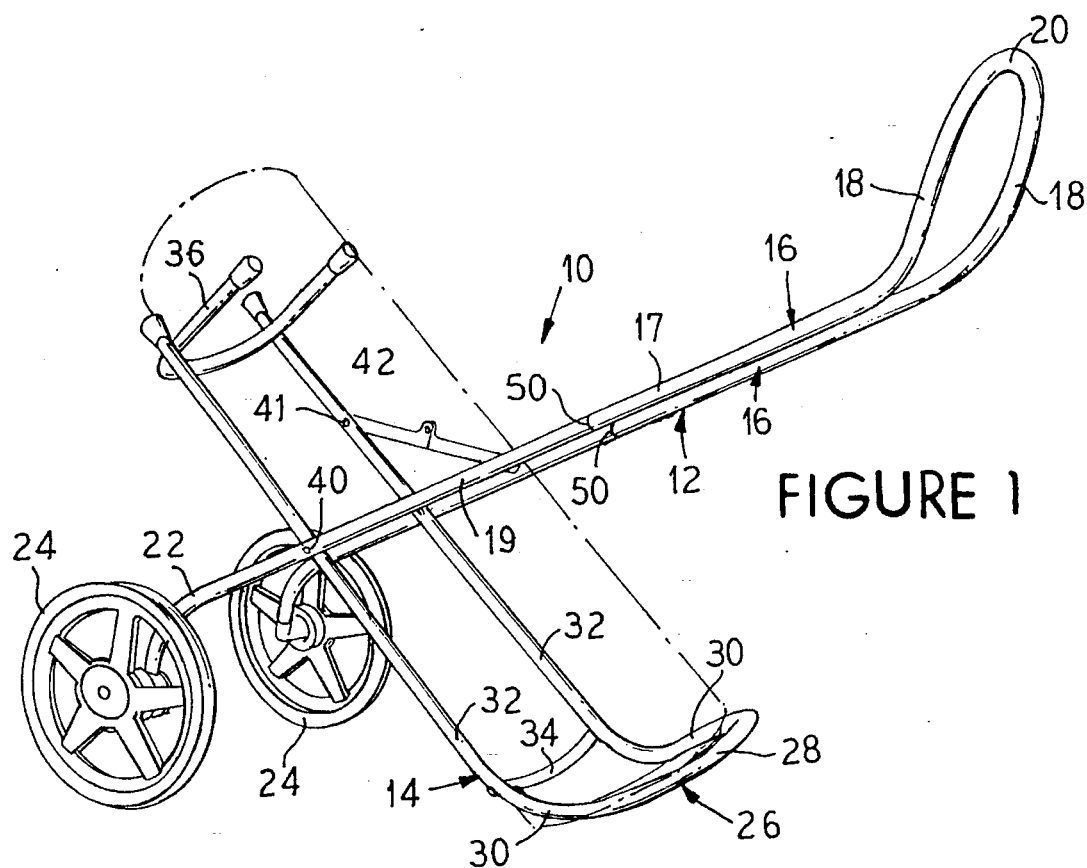
FIG. 1 is a perspective view of a golf cart illustrating one embodiment of the present invention.

While this invention is susceptible of embodiment in many different forms, there is shown in the drawings and will be described herein in detail specific embodiments thereof with the understanding that the present disclosure is to be considered as an exemplification of the principles of the invention and is not limited to the specific embodiments illustrated.

As shown in FIG. 1, a cart or carriage 10 includes an elongated carriage frame 12 and a cradle 14 shown with a phantom outline of a golf bag received therein. Carriage frame 12 is preferably U-shaped, and includes arms 16, which terminate at an upper end into respective handle bights 18. Handle bights 18 are connected together by handle 20. Each arm terminates at a lower end into respective wheel bights 22. Each wheel bight 22 is connected to an axle (not shown) on which are journaled wheels 24. Carriage frame 12 is connected to cradle 14 at pivot points 40.

As illustrated in FIG. 1, cradle 14 preferably is U-shaped, and includes a base 26 at a lower end that includes a base cross bar 28 and two cradle bights 30. Cradle bights 30 are connected to cradle arms 32. Preferably, a base cross member 34 is connected between cradle arms 32 at their junction with cradle bights 30 for enhanced structural rigidity, if desired.

Cradle arms 32 extend and terminate upwardly. Located between and proximal to the upwardly terminating ends of cradle arms 32 is a bag guide 36. Usually, a golf bag (shown in phantom) received on cradle 14 will extend past the upwardly terminating ends of cradle arms 32. The bottom of the bag rests on base 26 as can be seen in FIG. 1.

Figure 3:
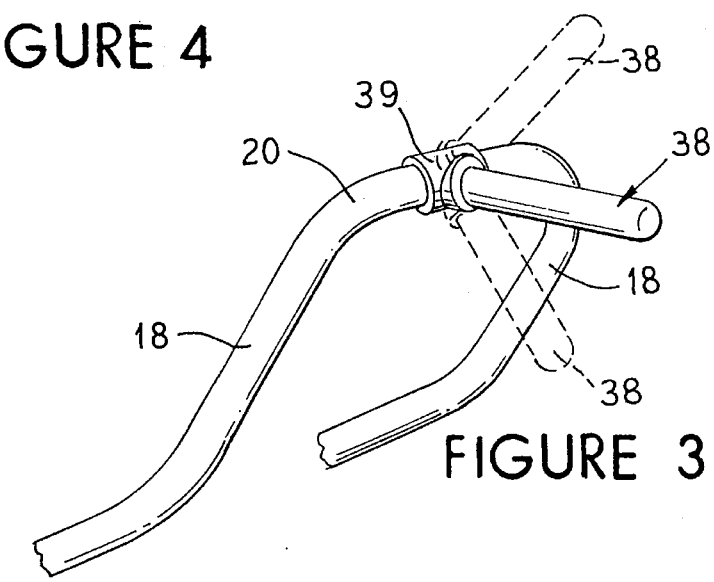
FIG. 3 is a fragmentary perspective view of a handle extension that embodies a further aspect of the present invention.

A handle extension 38 that may be used in conjunction with handle 20 is shown in FIG. 3. preferably, handle extension 38 extends away from cradle 14 to facilitate the operation of cart 10. Handle extension 38 can be permanently and/or adjustably attached to handle 20. An example of an adjustable handle extension 38 includes an adjustable connector sleeve 39 connecting handle extension 38 to handle bar 20 with an adjustable securement means such as a set screw (not shown). Handle extension 38 can then be adjusted by rotation, repositioning it to the preference of the operator. Handle extension 38 can terminate in a set screw so that counter-rotation of handle extension 38 tightens it in a desired position.

Cradle 14 can have unrestricted, restricted, or no movement around pivot points 40 as desired. A lockable hinge 42, preferably collapsible, holds the cradle at an obtuse angle relative to the frame and prevents the movement of cradle 14 relative to the frame 12 when extended and locked. When collapsed, hinge 42 allows restricted movement of cradle 14 at pivot point 40 so that cradle 14 can be received within frame 12 for storage or transport purposes. Other suitable alternatives to the hinge are a brace pivotally connected to the carriage frame. The brace preferably has a longitudinal slot which engages a guide pin 41 connected to the cradle. The guide pin 41 can have a wing nut at the projecting end so that the slotted brace can be secured to the carriage in an angular relation to the carriage frame. Cradle 14 can be folded generally parallel and adjacent to carriage frame 12 when the hinge is collapsed for the brace loosened.

As also shown in FIG. 1, retraction regions 50 facilitate collapsible transport and storage of cart 10. At retraction regions 50 and below, the lower portions of arms 16 have a relatively larger diameter than adjacent upper arm portions so that the adjacent upper arm portions can slidably telescope into the relatively larger diameter arm portions. Or, the arm positions may be removed from engagement with each other during transportation and storage. Alternatively, arms 16 may be hinged or articulated so as to be foldable.

Figure 4:
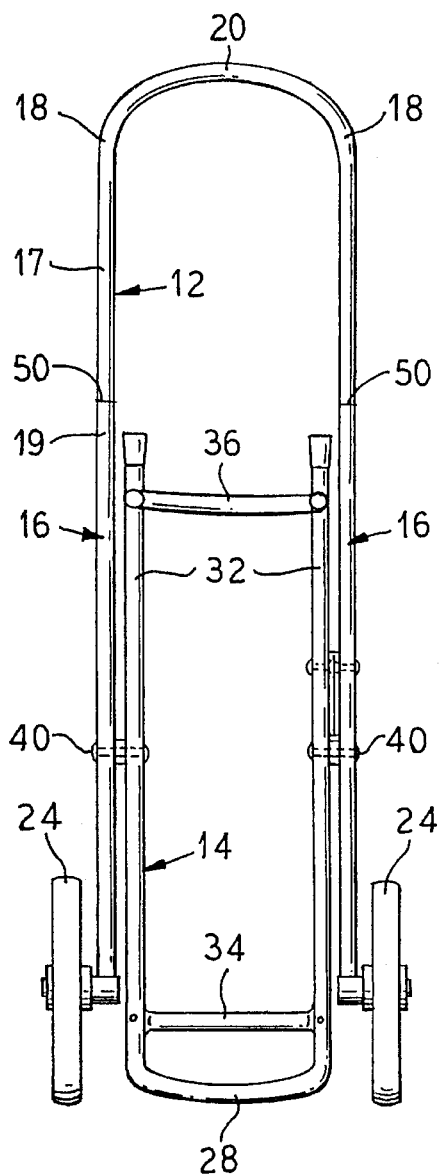
FIG. 4 is a front elevational view showing a golf cart embodying the present invention when in a storage configuration.
Figure 5:
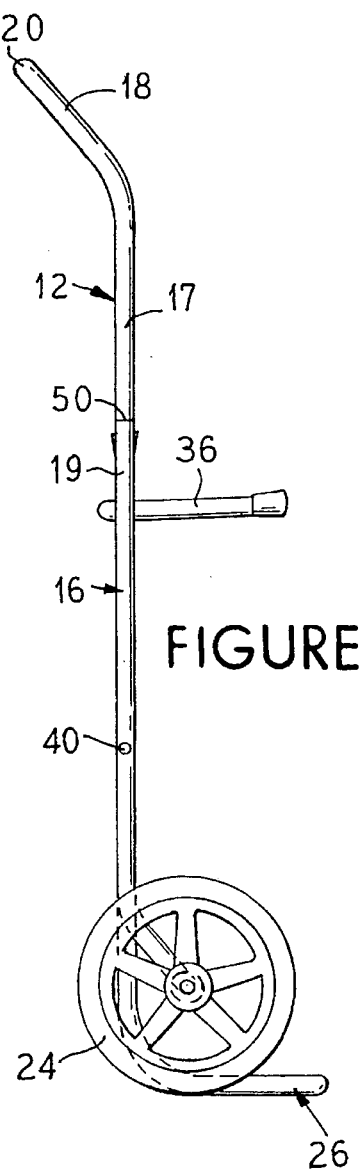
FIG. 5 is a side elevational view of the cart shown in FIG. 4.

A storage configuration of the golf cart shown in FIG. 1 is illustrated in FIGS. 4 and 5. Cradle 14 is pivoted into substantially the same plane as carriage frame 12 upon release of the hinge or brace 42 (FIG. 1). Also, the upper arm portions 17 are slidably received within lower arm portions 19 so as to reduce the overall lengthwise dimension of the golf cart. In the configuration shown FIGS. 4 and 5 golf carts embodying the present invention are readily stackable or nestable with attendant space economics.

Figure 2:
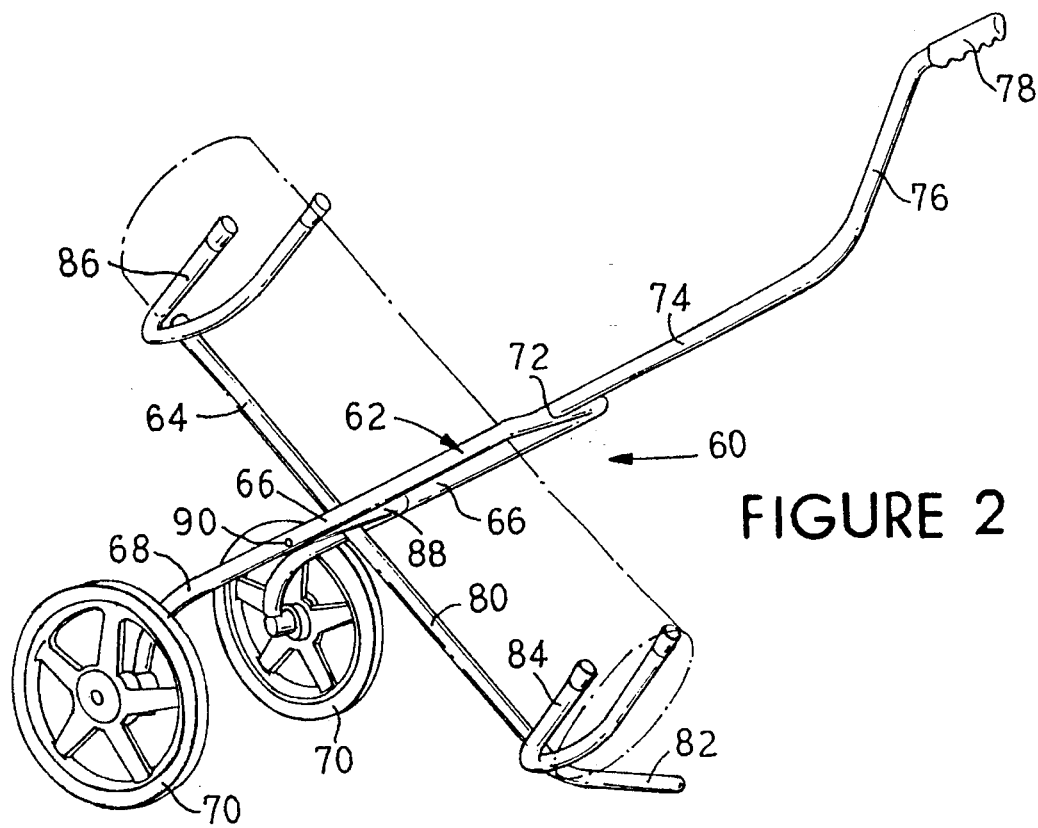
FIG. 2 is a perspective view of a golf cart illustrating another embodiment of the present invention.

FIG. 2 depicts another embodiment of the present invention. A cart or carriage 60 includes carriage frame 62 and cradle 64. Carriage frame 62 is bifurcated i.e., generally fork-shaped, and includes substantially parallel arms 66 that merge into stem 74 at the upper end. Arms 66 terminate at their respective lower ends into wheel bights 68 that are connected to wheels 70 rotatably mounted to axles in a manner similar to that described for the FIG. 1 embodiment.

Arms 66 terminate at the upper end into arm junction 72 connected to a stem 74 that merges into a handle bight 76 terminating in a handle 78. Stem 74 and handle 78 are generally parallel to one another.

Cradle 64 includes a cradle rod 80 that terminates into a bight portion that forms bag stop or base 82. Preferably, cradle rod 80 and bag stop 82 form an obtuse angle. Generally located at a junction of the cradle rod 80 and bag stop 82 is a pair of guide arms 84, 86. Guide arms 84 and 86 are spaced from one another and form a generally U-shaped receptacle. Guide arms 84, 86 are mounted generally perpendicular to and extend upwardly from cradle rod 80. Cradle 64 is relatively shorter in length than a typical golf bag (shown in phantom) received therein. Guide arms 84 and 86 preferably are pivotably mounted to cradle rod 80 so that they can be folded against cradle rod 80 for storage.

Cradle 64 is connected to a cradle cross member 88 in a generally perpendicular configuration. Cradle cross member 88 can be rotatably or rigidly connected to arms 66 of carriage frame 62 at pivot points 90, as desired.

Cart 60 shown in FIG. 2 may be collapsible or rigid. In a collapsible variant, for example, cradle axle 88 may be lockable and releasably rotatable about pivot points 90. Guide arms 84 and 86 may be hinged to cradle rod 80 so that during storage they may be positioned adjacent and folded against cradle rod 80 as mentioned hereinabove. Bag stop 82 may also be hinged to cradle rod 80 so that it can be folded adjacent to cradle rod 80.

Stem 74 may be hingedly articulated or telescoping. If telescoping, stem 74 may be rotatable to situate handle bight 76 and handle 78 coplanar with arms 66. Or, stem 74 may be hinged to handle bight 76, which may be hinged to handle 78, so that handle bight 76 and handle 78 may be folded adjacent to stem 74. Further, axles connecting wheel bights 68 to wheel 70 may be rotatable to allow the wheels 70 to be pivoted about wheel bights 68. With this configuration, the wheels can be folded so as to be superposed relative to one another. Further, the wheels and/or the axles may be removable from the carriage frame.

Carriage frame 12 of FIG. 1 can also be utilized in conjunction with cradle 64 of FIG. 2. Likewise, cradle 14 of FIG. 1 can be connected to carriage frame 62 of FIG. 2.

Numerous variations and modifications of the embodiments described may be effected without departing from the spirit and scope of the novel features of the invention. It is to be understood that no limitations with respect to the specific devices illustrated herein are intended or should be inferred. It is, of course, intended to cover by the appended claims all such modifications as fall within the scope of the claims.

We claim:

1. A golf cart for holding a golf bag on a support surface comprising:

an elongated, upstanding carriage frame terminating at an upper end thereof in a handle and having mounted to a lower end thereof a pair of carriage wheels; and a generally planar golf bag cradle mounted to said carriage frame, the cradle including an upper end that extends upwardly from the carriage and a lower end that terminates at a bag stop between the pair of wheels and the handle, wherein the bag stop supports the golf bag and is a base that defines a stand for the cart to rest on the support surface between the pair of wheels and the handle, wherein the cradle is generally U-shaped and includes at least two generally coplanar parallel elongated cradle arm, and wherein the cradle arms are connected to respective bights and the bag stop is defined by a base crossbar extending between the bights connected to the cradle arms.

2. The golf cart of claim 1 wherein the carriage frame is generally U-shaped and includes at least two generally coplanar, parallel arms extending between the handle and wheels.

3. The golf cart of claim 2 wherein the carriage frame arms respectively terminate into handle bights at the upper end.

4. The golf cart of claim 2 wherein the carriage frame arms respectively terminate into wheel bights at the lower end.

5. The golf cart of claim 2 wherein the carriage frame arms are retractable.

6. The golf cart of claim 1 further comprising an adjustable handle connected to the carriage frame.

7. The golf cart of claim 1 wherein the cradle is mounted to the carriage frame at a point between the pair of wheels and the handle to define a generally X-shaped configuration with the carriage frame at that point.

8. The golf cart of claim 1 wherein the golf bag is supportable at the upper end of the cradle.

9. The golf cart of claim 1 wherein the golf bag is disposed coextensive with the longitudinal dimension of the cradle.

10. A golf cart for holding a golf bag on a support surface comprising:

an elongated, upstanding carriage frame terminating at an upper end thereof in a handle and having mounted to a lower end thereof a pair of carriage wheels; and a golf bag cradle including generally coplanar parallel elongated cradle arms having upper ends and a base which includes lower end bights and a base cross bar and mounted to said carriage frame so that the pair of wheels and the base together define a plane and so that the base defines a stand to support the cart and the base is adapted to rest in said plane and upon tile support surface between the pair of wheels and the handle, wherein the cradle is generally U-shaped and the cradle arms are connected to respective lower end bights and to one another at the base by a base cross member extending between the cradle bights.

11. A golf cart for holding a golf bag on a support surface comprising:

an elongated, upstanding carriage frame terminating at an upper end thereof in a handle and having mounted to a lower end thereof a pair of carriage wheels; and a generally planar golf bag cradle mounted to said carriage frame, the cradle including an upper end that extends upwardly from the carriage and a lower end that terminates at a bag stop between the pair of wheels and the handle, wherein the bag stop supports the golf bag, wherein the bag stop is a base that defines a stand for the cart to rest on the support surface between the pair of wheels and the handle, wherein the cradle is generally U-shaped and includes at least two generally coplanar parallel elongated cradle arms, and wherein the cradle includes a generally U-shaped bag guide at the upper end of the cradle.

12. The golf care of claim 11 wherein the generally U-shaped guide is connected to the cradle arms.

13. A golf cart for holding a golf bag on a support surface comprising:

an elongated, upstanding carriage frame terminating at an upper end thereof in a handle and having mounted to a lower end thereof a pair of carriage wheels; and a golf bag cradle including generally coplanar parallel elongated cradle arms having upper ends and a base which includes lower end bights and mounted to said carriage frame so that the pair of wheels and the base together define a plane and so that the base defines a stand to support the cart and the base is adapted to rest in said plane and upon the support surface between the pair of wheels and the handle, wherein the cradle is generally U-shaped and the cradle arms are connected to one another at the base, wherein the cradle includes a generally U-shaped bag guide connected to the cradle arms at the upper ends thereof, and wherein the base and the guide are foldable to a position generally adjacent to the cradle arms.

14. A golf cart for holding a golf bag on a support surface comprising:

an elongated, upstanding carriage frame terminating at an upper end thereof in a handle and having mounted to a lower end thereof a pair of carriage wheels; and a generally planar golf bag cradle mounted to said carriage frame, the cradle including an upper end that extends upwardly from the carriage and a lower end that terminates at a bag stop between the pair of wheels and the handle, wherein the bag stop supports the golf bag and is a base that defines a stand for the cart to rest on the support surface between the pair of wheels and the handle.

wherein the cradle is pivotably mounted to the carriage frame at a predetermined pivot point between the wheels and the handle.

15. The golf cart of claim 14 wherein the carriage frame is bifurcated and includes at least two generally coplanar, parallel arms and a stem, the arms extending downwardly toward and between the wheels, and the stem, extending upwardly and terminating in a handle.

16. The golf cart of claim 15 wherein the stem is rotatably mounted relative to the arms.

17. The golf cart of claim 15 wherein the cradle includes a cradle arm which is a cradle rod having upper and lower ends, and generally U-shaped bag guides are mounted to the cradle rod in a spacial relationship to one another.

18. The golf bag of claim 17 wherein the bag guides and the base are foldable adjacent to the cradle rod.

19. The golf bag of claim 18 wherein the base is defined by a bight portion at the lower end of the cradle rod.

* * * * *